(12) United States Patent
Bourque

(10) Patent No.: US 8,336,935 B2
(45) Date of Patent: Dec. 25, 2012

(54) SHEET MATERIAL GRIPPING DEVICE

(76) Inventor: Eric Bourque, Comeauville (CA)

( * ) Notice: Subject to any disclaimer, the term of this patent is extended or adjusted under 35 U.S.C. 154(b) by 0 days.

(21) Appl. No.: 13/033,004

(22) Filed: Feb. 23, 2011

(65) Prior Publication Data

US 2011/0227357 A1  Sep. 22, 2011

(30) Foreign Application Priority Data

Mar. 19, 2010  (CA) .................................... 2697320

(51) Int. Cl.
*B65G 9/00* (2006.01)
(52) U.S. Cl. .................... 294/16; 294/164; 294/114
(58) Field of Classification Search ............. 294/114, 294/164, 901, 101, 15, 16, 102.1
See application file for complete search history.

(56) References Cited

U.S. PATENT DOCUMENTS

| | | | | |
|---|---|---|---|---|
| 2,646,307 A * | 7/1953 | Phalin | ............... | 294/114 |
| 2,654,630 A * | 10/1953 | Renfroe | ............... | 294/104 |
| 2,676,838 A * | 4/1954 | Gardner | ............... | 294/104 |
| 2,852,300 A * | 9/1958 | Gardner | ............... | 294/104 |
| 3,239,263 A * | 3/1966 | Farmer et al. | ............... | 294/114 |
| 3,653,708 A * | 4/1972 | Merola | ............... | 294/102.1 |
| 3,857,600 A * | 12/1974 | Hasegawa | ............... | 294/104 |
| 4,013,202 A | 3/1977 | Russo | | |
| 4,349,225 A | 9/1982 | Collins et al. | | |
| 4,938,517 A * | 7/1990 | Langloy | ............... | 294/101 |
| 7,819,448 B2 * | 10/2010 | Bates | ............... | 294/101 |
| 2006/0061112 A1 * | 3/2006 | Schon | ............... | 294/101 |

OTHER PUBLICATIONS

Webpages featuring "Gorilla Gripper," manufactured by Landon Innovations LLC, http://gorillagripper.com (4 pages) (2003).
"Gorilla Gripper," manufactured by Landon Innovations LLC, http://www.leevalley.com/en/wood/page.aspx?c=&p=58661&cat=51&ap=1 (1 page) (date of first publication unknown).
"Gorilla Gripper," manufactured by Landon Innovations LLC, http://gorillagripper.com/gripper.html (1 page) (2003).

* cited by examiner

*Primary Examiner* — Saul Rodriguez
*Assistant Examiner* — Gabriela Puig
(74) *Attorney, Agent, or Firm* — Thompson Hine LLP

(57) ABSTRACT

A gripping device for gripping sheet material. The gripping device comprises a frame structure and a first gripping member connected thereto. A second gripping member is rotatable mounted to the frame structure. The second gripping member is rotatable between an open position and a closed position for providing a gripping force acting on an object disposed between the first gripping member and the second gripping member. A disengaging mechanism is connected to the second gripping member for moving the second gripping member from the closed position to the open position by providing pushing action acting on the second gripping member.

8 Claims, 16 Drawing Sheets

SHEET MATERIAL GRIPPING DEVICE

This application claims priority to Canadian Patent Application No. 2,697,320, entitled SHEET MATERIAL GRIPPING DEVICE and filed on Mar. 19, 2010, the entire contents of which are incorporated herein.

FIELD

The present invention relates to the field of carrying devices, and more particularly to a device for manually gripping and handling sheet material.

BACKGROUND

In present day construction various types of sheet construction materials such as, for example, wallboard, sheet rock, and plywood are used. Standard sizes for sheet construction materials are in the range of four by eight feet or more, making them heavy and difficult to handle. Furthermore, they are vulnerable to damage if not handled with care. Typically, the sheet construction material is manually transported to its final destination, for example, via stairways or inclines and around obstacles in a building.

Various devices for assisting the manual transport of sheet materials have been provided. A first type of such devices comprises simply a bottom support and a handle connected to the bottom support and disposed at predetermined distance above the bottom support. The sheet material is placed on the bottom support and then carried with the handle. Unfortunately, it requires the lifting of the sheet material without the tool on and off the bottom support. Furthermore, it is not suited for stairways or inclines since the sheet material tends to slip off the bottom support when not carried horizontally.

Another type of sheet material carrier comprises three rods attached perpendicular to a flat member with the three rods forming a straight line or a "V" shape. The sheet material is hold between two of the three rods and the third rod is used as the handle. This type of sheet material carrier has various disadvantages such as: pulling unevenly on the panel, tending to slip with heavier materials; and, tending to slip when used on stairways.

The Gorilla Gripper™ holds the top of the sheet material between two flat metal plates when the handle is lifted, squeezing harder when the sheet material is heavier. Unfortunately, the Gorilla Gripper™ has the tendency to release the sheet material if it touches the ground when in use, making it unsuitable for use on stairways and uneven terrain.

Another type of sheet material carrier comprises two opposing cams or one cam and an opposing surface for holding the sheet material there between, as disclosed, for example, in U.S. Pat. No. 4,013,202 (Russo) and U.S. Pat. No. 4,349,225 (Collins et al.). As the device is lifted the cams rotate towards the sheet material thus gripping it. A disadvantage of this type of sheet material carrier is that the cams are slid over the sheet material to engage and disengage it, causing wear on the non-slip coating of the cams as well as on the sheet material. Furthermore, the two opposing cams or the one cam and the opposing surface are disposed having a fixed distance there between, i.e. enabling proper gripping of sheet material within a very limited range of thickness.

SUMMARY

In one embodiment the present invention provides a sheet material gripping device for manually gripping and handling sheet material that substantially prevents accidental disengagement from the sheet material during transport on stairways and uneven terrain.

In another embodiment the present invention provides a sheet material gripping device for manually gripping and handling sheet material that quickly and easily releases the sheet material.

In another embodiment, the present invention provides a sheet material gripping device for manually gripping and handling sheet material that enables proper gripping of sheet materials in a wide range of thicknesses.

According to one aspect of the present invention, there is provided a gripping device. The gripping device comprises a frame structure and a first gripping member connected thereto. A second gripping member is rotatable mounted to the frame structure. The second gripping member is rotatable between an open position and a closed position for providing a gripping force acting on an object disposed between the first gripping member and the second gripping member. A disengaging mechanism is connected to the second gripping member for moving the second gripping member from the closed position to the open position by providing pushing action acting on the second gripping member.

According to one aspect of the present invention, there is provided a gripping device. The gripping device comprises a frame structure and a first gripping member connected thereto. A second gripping member is rotatable mounted to the frame structure The second gripping member is rotatable between an open position and a closed position for providing a gripping force acting on an object disposed between the first gripping member and the second gripping member. A disengaging mechanism is connected to the second gripping member for moving the second gripping member from the closed position to the open position by providing pushing action acting on the second gripping member. A lock mechanism is connected to the frame structure and interacts with the disengaging mechanism for preventing movement of the second gripping member from the closed position to the open position.

An advantage of the present invention is that it provides a sheet material gripping device for manually gripping and handling sheet material that substantially prevents accidental disengagement from the sheet material during transport on stairways and uneven terrain.

A further advantage of the present invention is that it provides a sheet material gripping device for manually gripping and handling sheet material that quickly and easily releases the sheet material.

A further advantage of the present invention is that it provides a sheet material gripping device for manually gripping and handling sheet material that enables proper gripping of sheet materials in a wide range of thicknesses.

BRIEF DESCRIPTION OF THE DRAWINGS

Certain embodiments of the present invention are described below with reference to the accompanying drawings, in which.

DETAILED DESCRIPTION

Figure 1A:
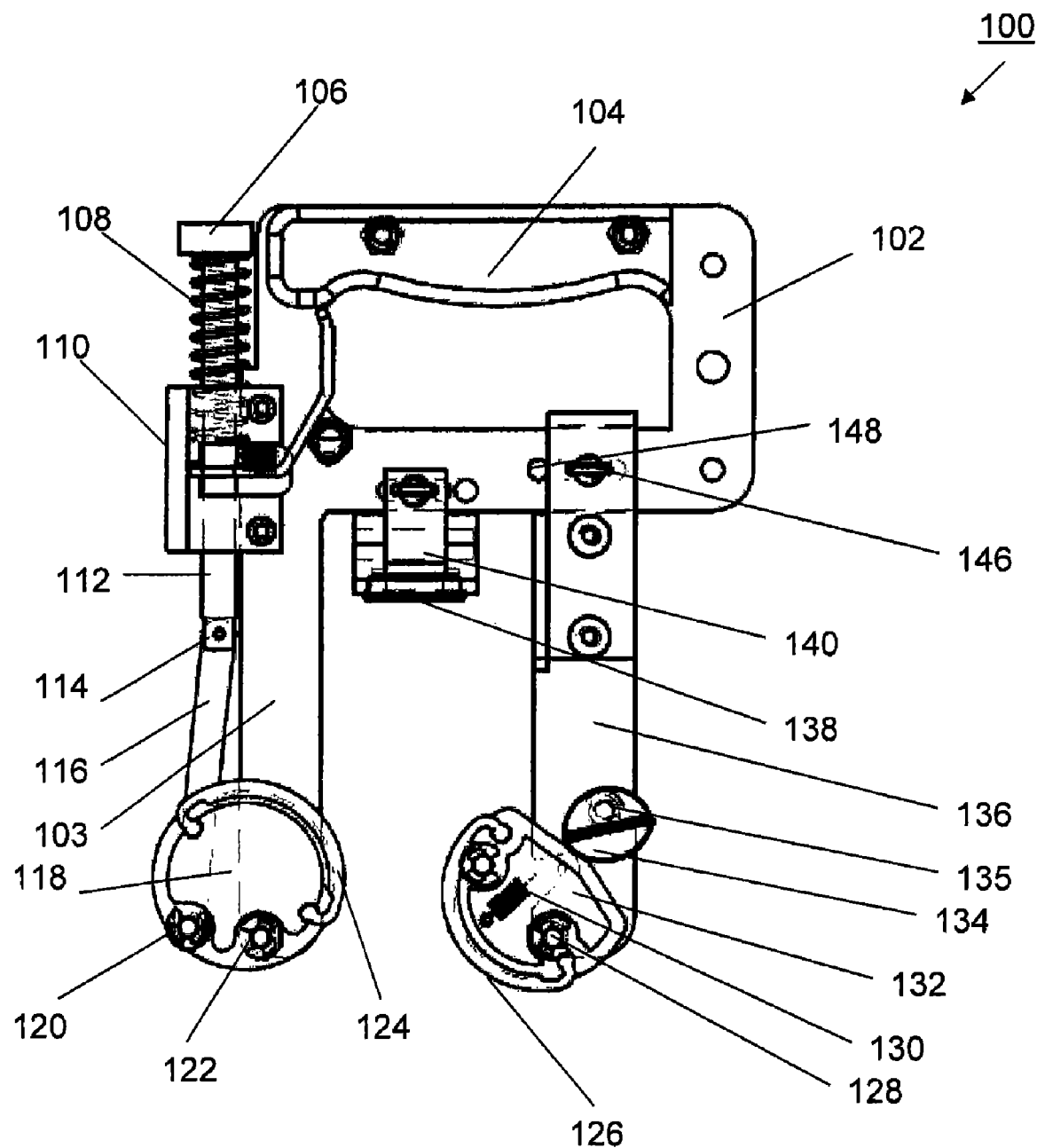
FIGS. 1a and 1b are simplified diagrams illustrating a front view and a perspective view, respectively, of a gripping device according to an embodiment of the invention with the gripping device being in an open position.

Unless defined otherwise, all technical and scientific terms used herein have the same meaning as commonly understood by one of ordinary skill in the art to which the invention belongs.

Although any methods and materials similar or equivalent to those described herein can be used in the practice or testing of the present invention, certain methods and materials are now described.

While embodiments of the invention will be described for a gripping device for manually gripping rigid sheet materials used in construction for the sake of simplicity, it will become evident to those skilled in the art that the embodiments of the invention are not limited thereto, but are also applicable for gripping flexible sheet materials, for pulling heavy objects such as, for example, mats or rugs, and for use with machinery such as, for example, cranes.

Referring to FIGS. 1a to 1h, a gripping device 100 according to an embodiment of the invention is provided. The gripping device 100 according to the illustrated embodiment of the invention comprises a frame structure 102 forming a handle 104 and having an extension 103. The frame structure 102 is made, for example, of injection-molded plastic or as a cut-out of an appropriate sheet metal such as, for example, steel, having a predetermined thickness for providing sufficient strength. The handle is formed by mounting, for example, handle pieces made of a durable hard plastic or other suitable solid and durable material and having a predetermined thickness and shape to the front side and back side of the frame structure 102.

Gripping member 118 is rotatably mounted at pivot 122 to the extension 103 of the frame structure 102. Gripping member 132 is rotatable mounted at pivot 128 to extension member 136 which is variable connected to the frame structure 102 for varying a distance between the gripping member 118 and the gripping member 132. The gripping members 118 and 132 are rotatable between an open position, illustrated in FIGS. 1a and 1b, and a closed position, illustrated in FIGS. 1c and 1d, for providing a gripping force acting on an object 152—for example, a piece of rigid sheet material as illustrated in FIGS. 1c and 1d—disposed between the gripping member 118 and the gripping member 132, with the gripping member 118 being rotated in clockwise direction and the gripping member 132 being rotated in counter-clockwise direction.

Figure 1B:
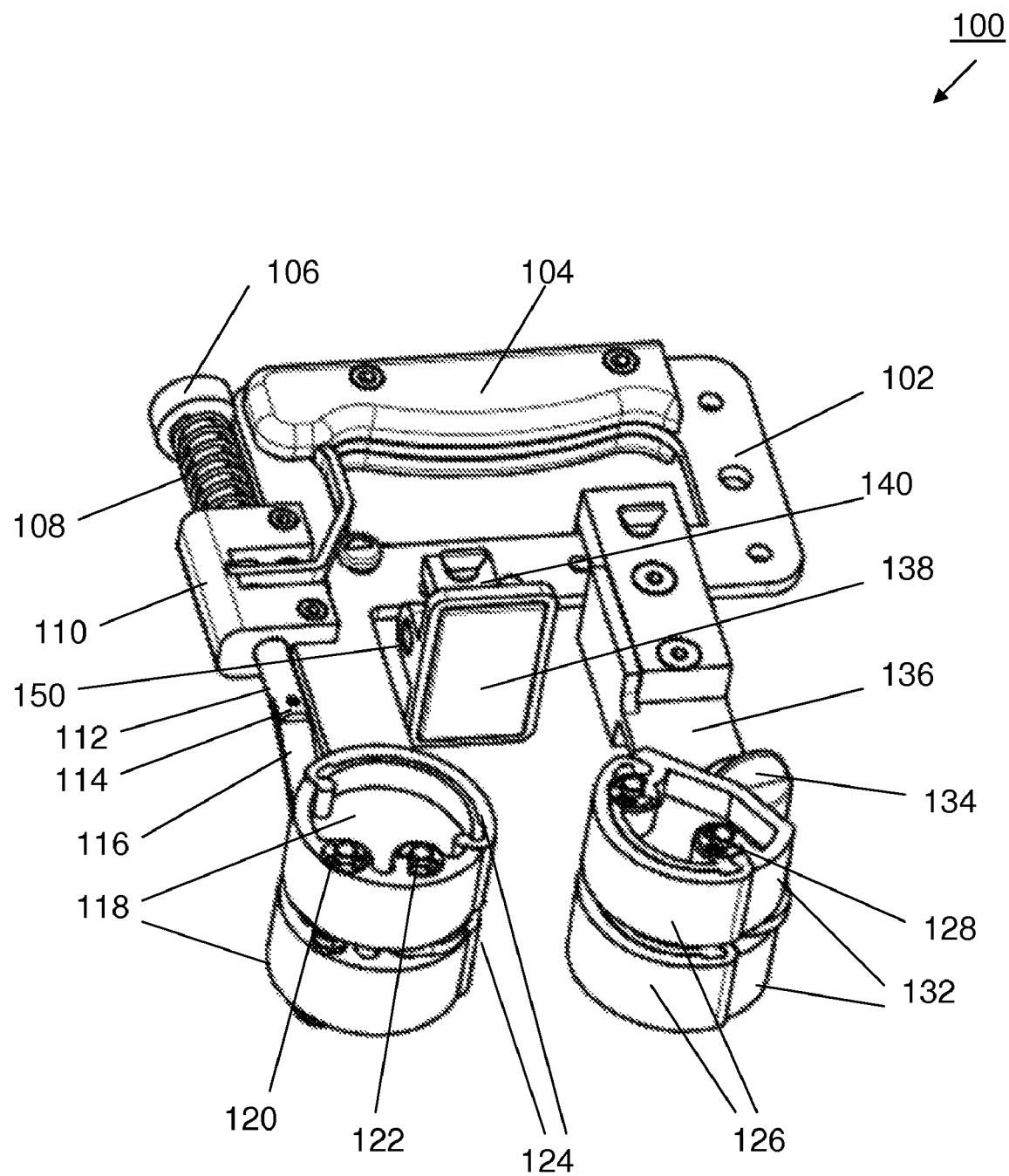
Figure 1C:
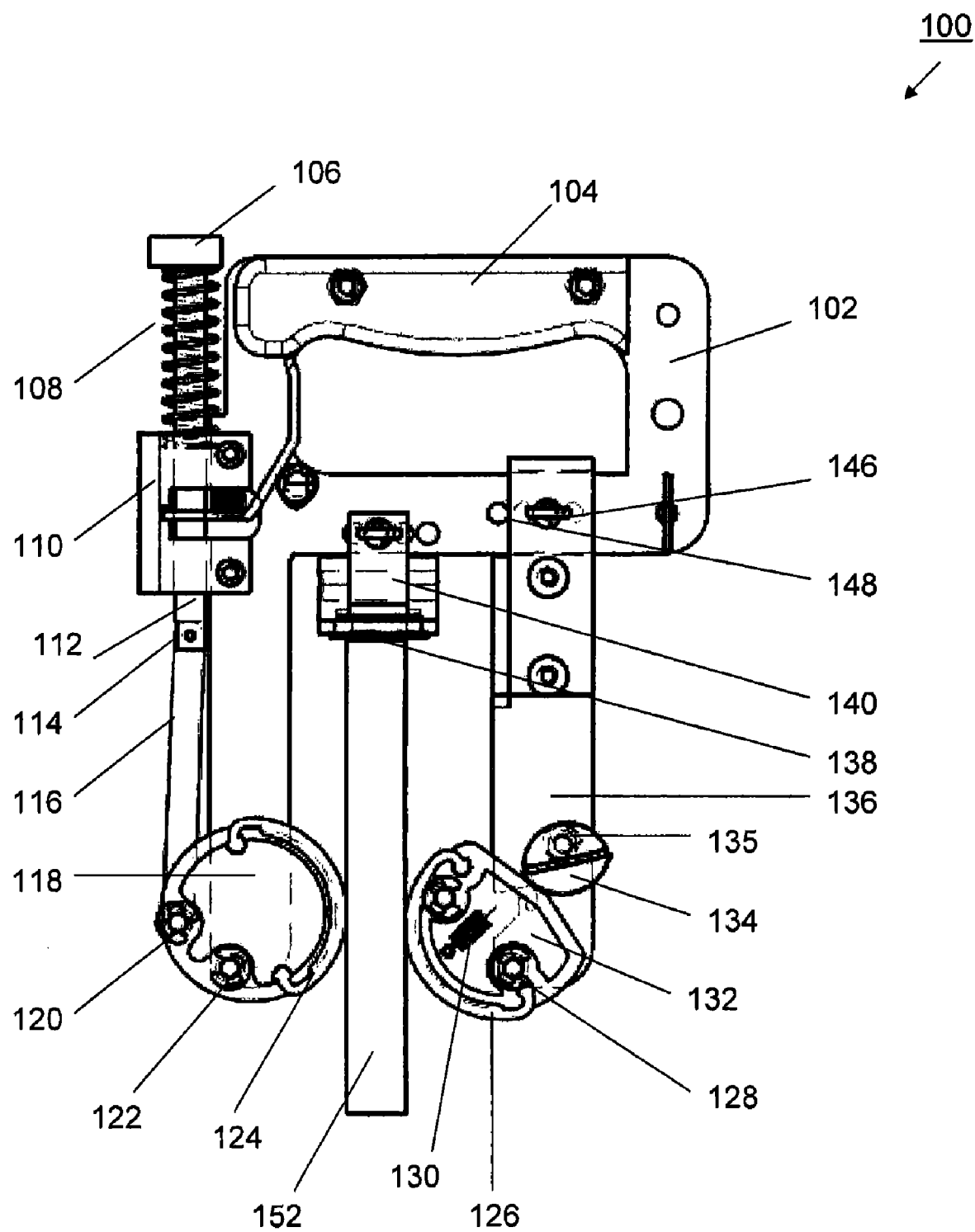
FIGS. 1c and 1d are simplified diagrams illustrating a front view and a perspective view, respectively, of the gripping device according to an embodiment of the invention with the gripping device being in a closed position.
Figure 1D:
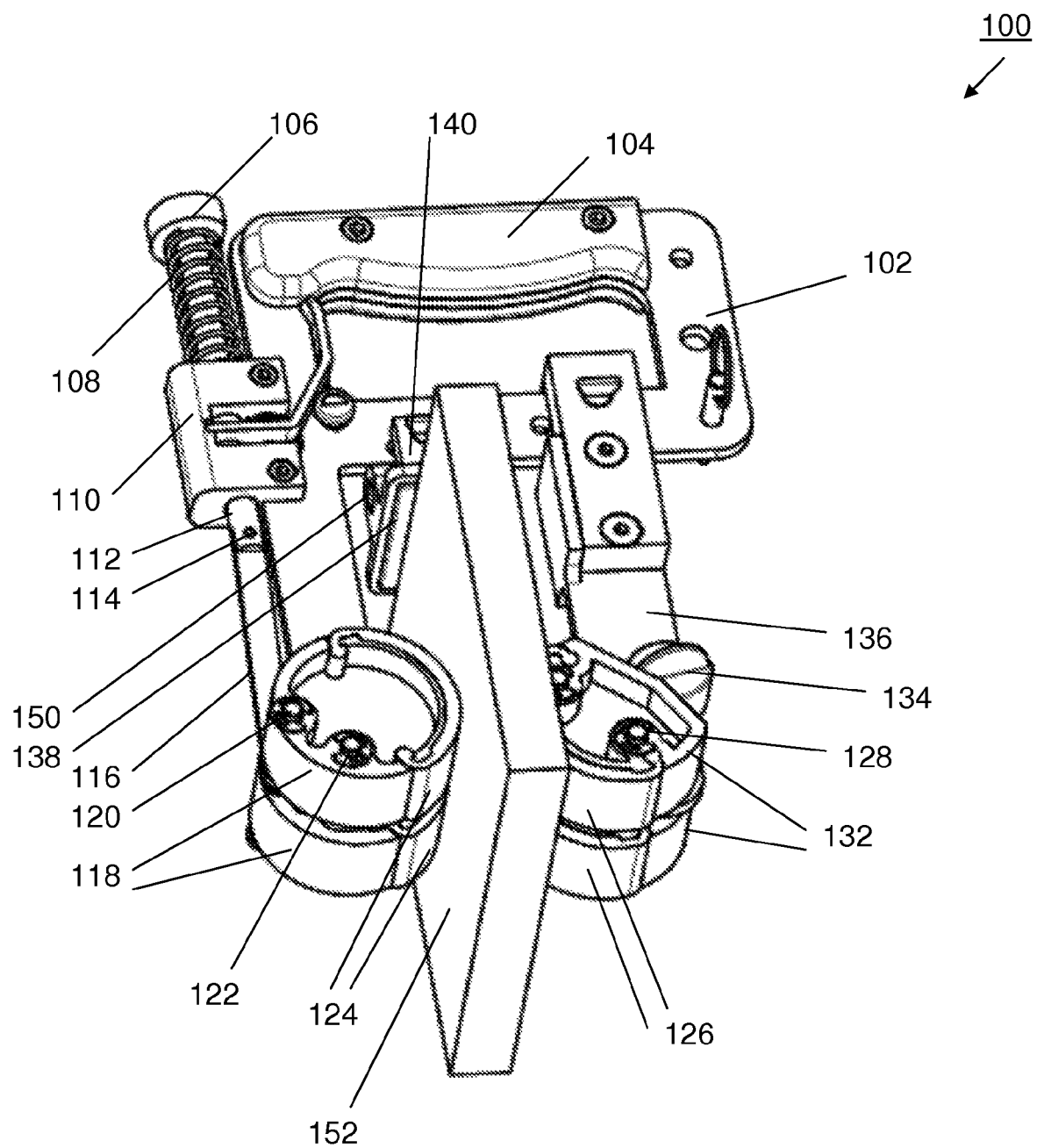

For example, wheel pairs 118 and 132 illustrated in FIG. 1b are eccentric and movably mounted about pivots 122 and 128 respectively, the wheel pairs being positioned to straddle the frame structure so that the frame structure is positioned between the wheel pairs. Alternatively, the gripping members 118 and 132 are disposed only on one side of the frame structure forming a single wheel each. Further alternatively, a cam like structure is employed in place of one or both of the wheel pairs 118 and 132.

Actuator 116 is rotatable mounted at pivot 120 to the gripping member 118 and rotatable mounted to shaft 112 at pivot 114 for transforming the rotational motion of the gripping member 118 into a longitudinal motion of the shaft 112. Using shaft guide 110 the shaft 112 is longitudinal movable mounted to the frame structure 102. The shaft guide 110 is mounted to the frame structure 102 using, for example, threaded bolts accommodated in respective bores of the shaft guide 110 and the frame structure 102 and secured with respective nuts. Alternatively, the shaft guide 110 is formed as an integral part of the frame structure 102, for example, by appropriately bending a predetermined portion of sheet metal forming the frame structure 102. The shaft 112 is movable between a first position associated with the open position of the gripping member 118 and a second position associated with the closed position of the gripping member 118. Spring member 108 connected to the shaft 112 and to the frame structure 102 or the shaft guide 110 holds the shaft in the second position. Alternatively, spring member 108 is replaced by a spring member connected to the gripping member 118 and the frame structure 102.

Spring member 130 connected to the gripping member 132 and the extension member 136 holds the gripping member 132 abutted against cam adjuster 134 rotatable mounted to the extension member 136 at pivot 135.

Abutting member 140 for abutting an edge of the object 152 via abutting surface 138 is variable mounted to the frame structure 102 and comprises pivot 150 for rotating the abutting surface 138.

Prior to the gripping of the object 152, a user holding the gripping device 100 at handle 104 pushes the shaft 112 by pressing button 106 with the thumb from the second position into the first position for moving the gripping member 118 into the open position. After placement of the gripping device 100 on the object 152, in one case with the abutting surface 138 abutting an edge of the object 152, the user releases the button 106 and the gripping member 118 is moved towards the closed position until non-slip pads 124 and 126 of the gripping members 118 and 132, respectively, are in contact with a respective surface of the object 152. The spring member 108 may provide sufficient force acting via the shaft 112 and the actuator 116 on the gripping member 118 to hold the gripping device 100 in place with respect to the object. During lifting of the object 152 the weight of the object 152 acts via the non-slip pads 124 and 126 on the gripping members 118 and 132, respectively, pulling them further towards the closed position, thus increasing the gripping force of the gripping members 118 and 132. The gripping device 100 is quickly and easily disengaged from the object 152 by pressing the button 106 for moving the gripping member 118 into the open position, while accidental disengagement is substantially prevented.

Figure 1E:
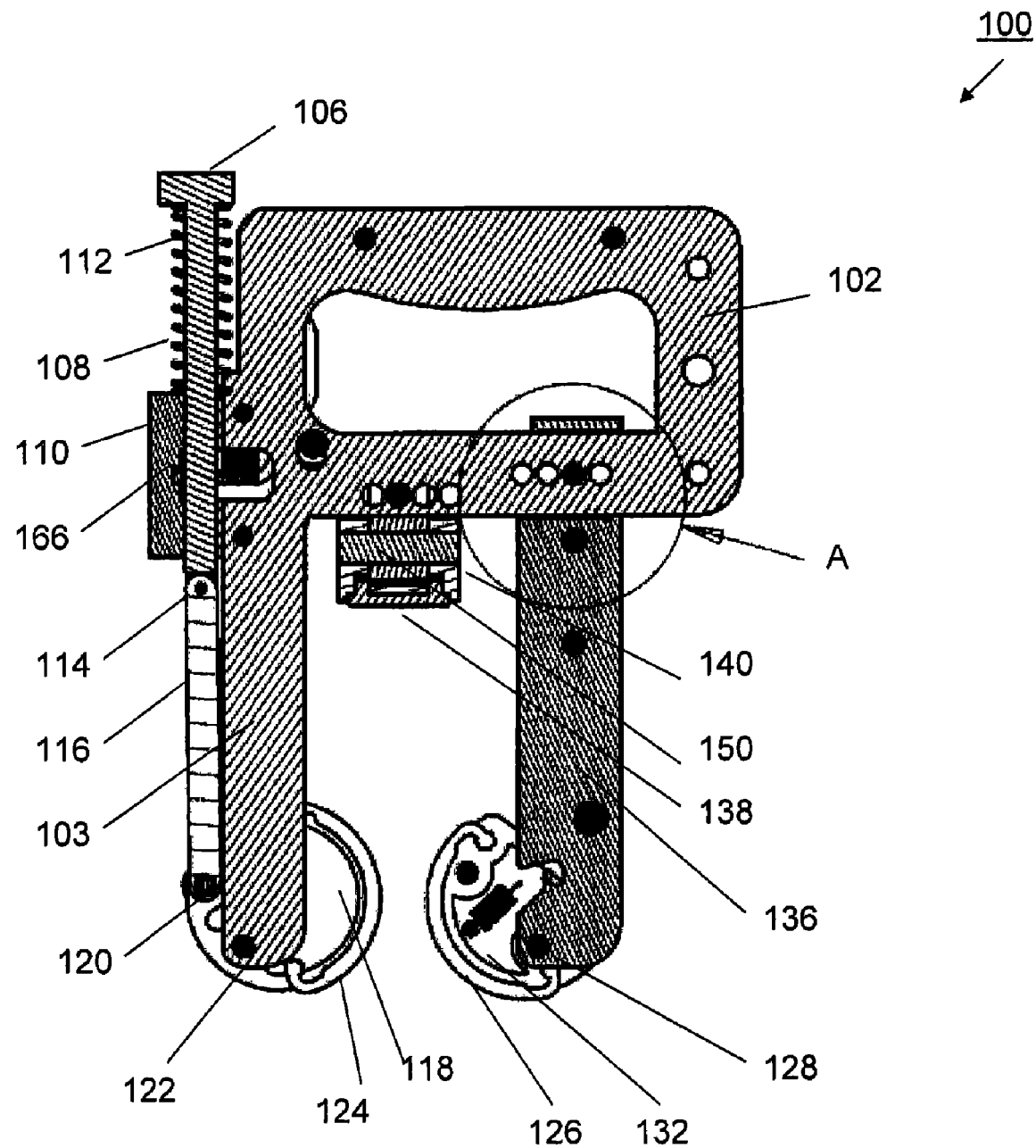
FIGS. 1e and 1f are simplified block diagrams illustrating a cross sectional view of the gripping device according to an embodiment of the invention with FIG. 1f illustrating Detail A indicated in FIG. 1e.
Figure 1F:
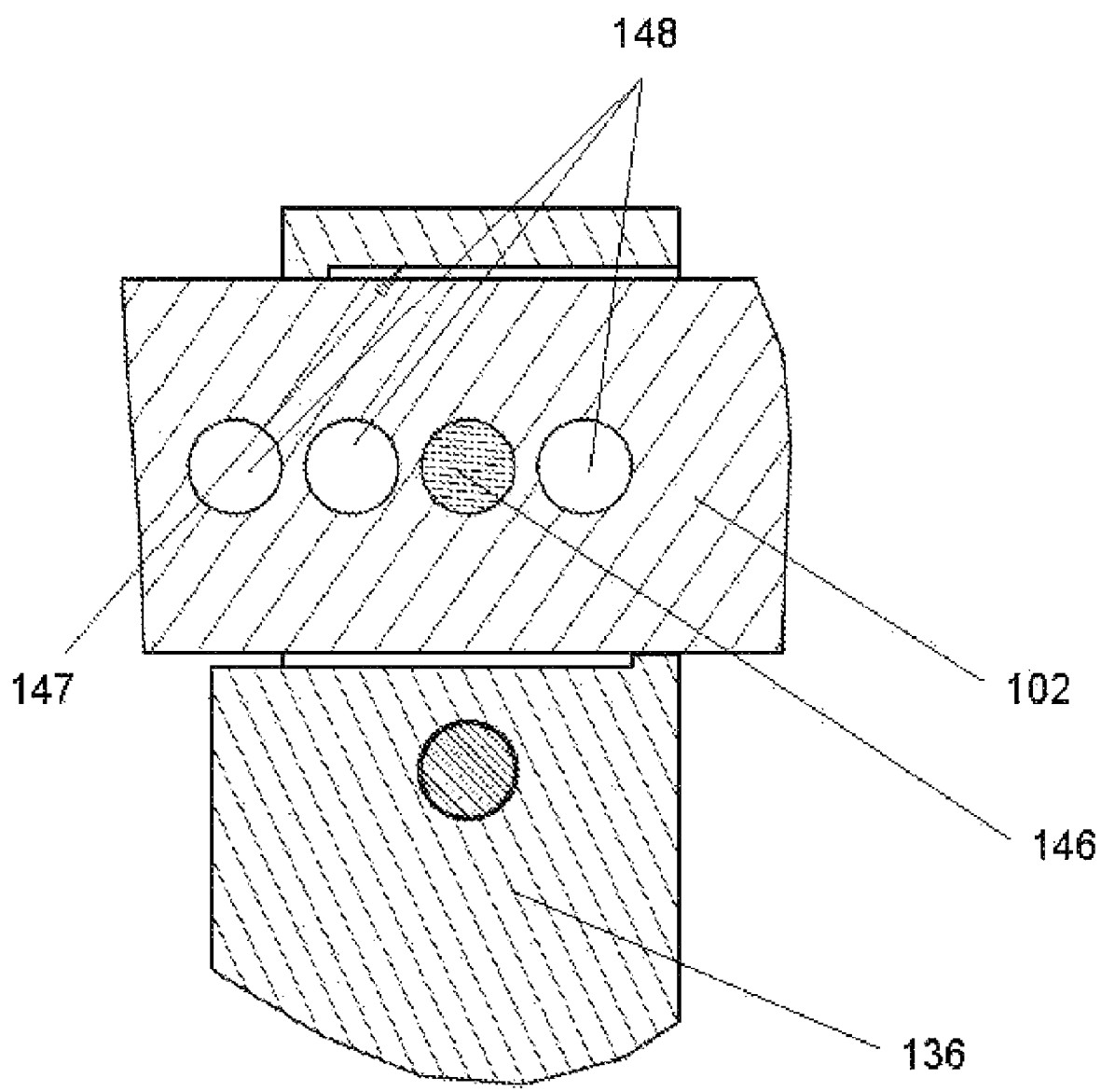

The gripping member 132 can be variable connected to the frame structure 102 via the extension member 136 forming a sliding arm as illustrated in FIGS. 1e and 1f with FIG. 1f illustrating detail A. Provision of gaps 147 at the interacting end portion of the sliding arm 136 facilitates relative movement between the sliding arm 136 and the frame structure 102. Provision of a plurality of bores 148 at predetermined locations of the frame structure 102 enable variable placement of the sliding arm 136 and connection thereto via pin 146 accommodated in one of the bores 148 and a respective bore of the sliding arm. Further, the abutting member 140 can be variable connected to the frame structure 102 in a similar fashion. Alternatively, other variable connecting mechanisms are provided such as, for example, a screw mechanism. Furthermore, the cam adjuster 134 enables further, smaller adjustments of the gripping member 132. Variably connecting the extension member 136 to the frame structure enables use of the gripping device 100 for gripping sheet materials in a wide range of thicknesses while ensuring that the materials are gripped such that slippage is substantially prevented.

Optionally, the variable connection is omitted and the extension member 136 forms a fixed portion of the frame structure 102, resulting in a simpler construction of the gripping device 100.

Figure 1G:
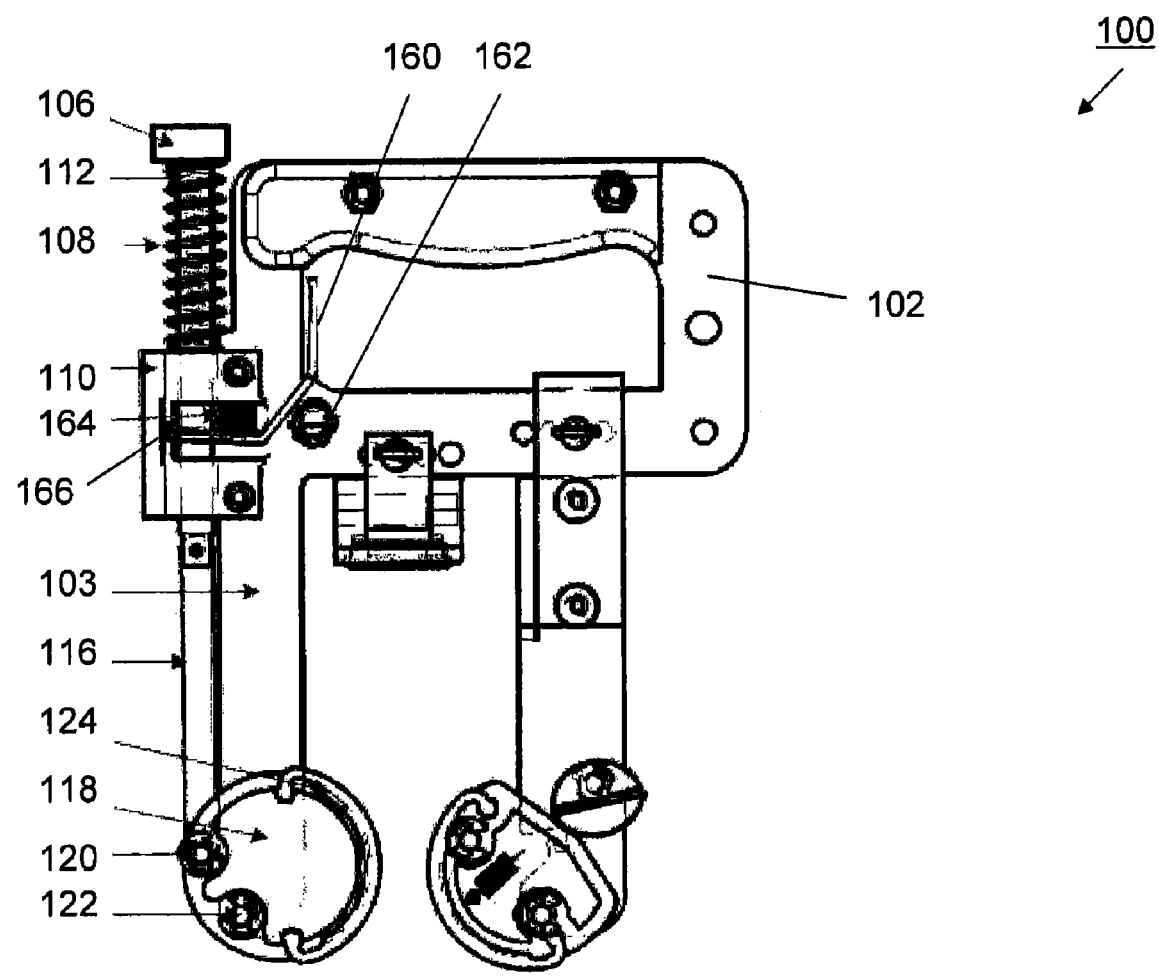
FIGS. 1g and 1h are simplified block diagrams illustrating a front view of a lock mechanism of the gripping device according to an embodiment of the invention with the lock mechanism being in a locked position and in a released position, respectively.
Figure 1H:
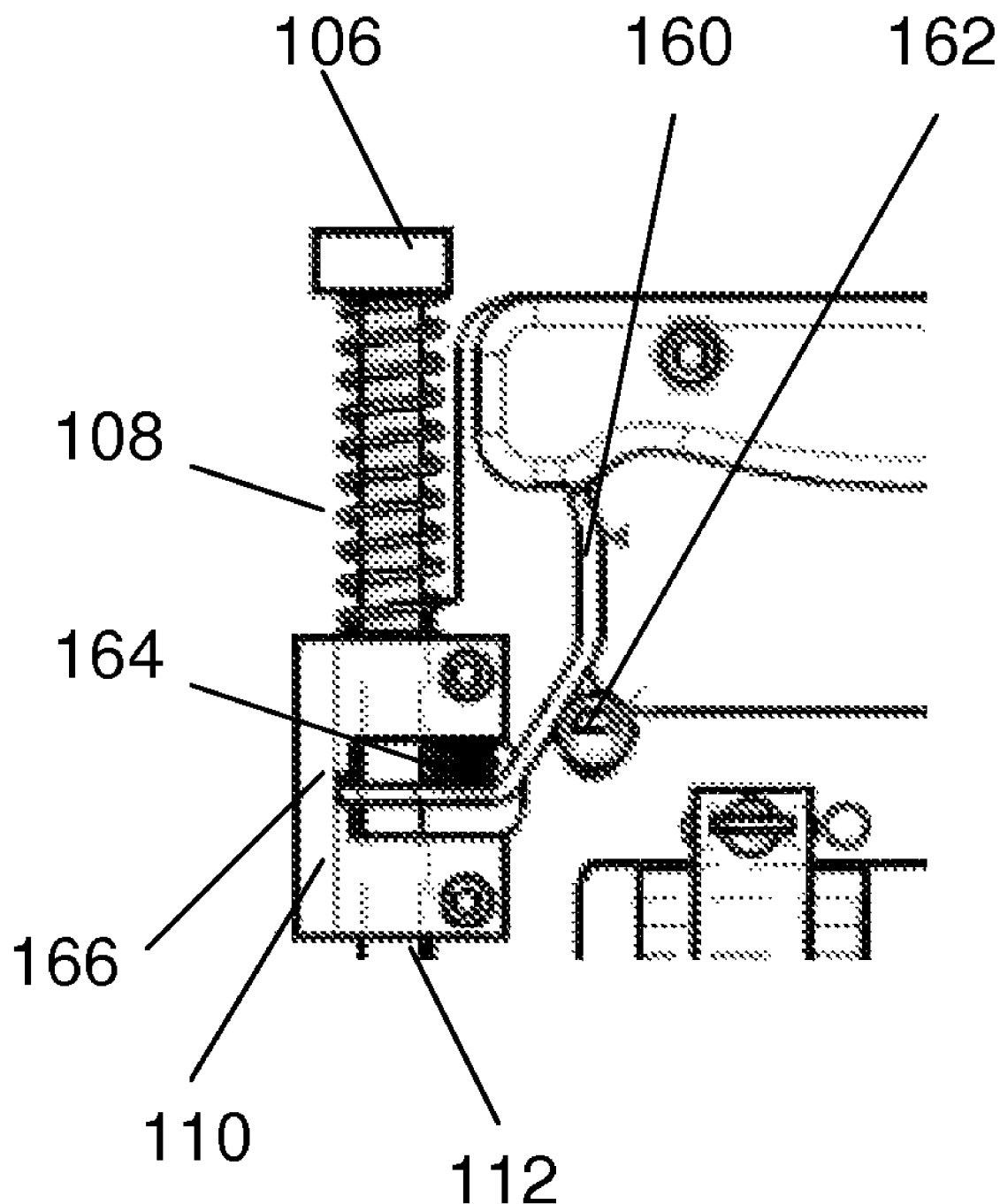

Referring to FIGS. 1g and 1h, a lock mechanism for use with the gripping device 100 according to the illustrated embodiment is provided. The lock mechanism comprises lock lever 160 having a first end portion accommodated in groove 166 of the shaft guide 110. The lock lever comprises an aperture having the shaft 112 accommodated therein. Lock spring 164 pushes a middle portion of the lock lever 160 towards lock button 162 which is slidable movable between a lock position "down", as illustrated in FIG. 1g, and an open position "up", as illustrated in FIG. 1h. When the lock button 162 is pushed down, the lock lever 160 is pushed slightly down by the lock spring 164 and jams the shaft 112 accommodated in the aperture of the lock lever 160, as illustrated in FIG. 1g. Downward movement of the shaft 112—corresponding to opening of the gripping member 118—further jams the shaft 112 in the aperture of the lock lever 160, thus preventing movement of the gripping member 118 from the closed position to the open position. Pushing the lock button up pushes the middle portion of the lock lever 160 up enabling free relative movement between the shaft 112 and the aperture of the lock lever 160, thus releasing the lock mechanism, as illustrated in FIG. 1h. Optionally, the lock button 162 is left in the "down" position and the lock mechanism is disengaged by pushing the second end portion of the lock lever 160 to the left using the index finger while holding the handle 104 of the gripping device 100.

For example, with the gripping device 100 in the locked mode, the user holds the gripping device 100 with the thumb near the button 106. Using the index finger the user presses the lock lever 160 to the left to disengage the lock mechanism. The gripping device 100 is then opened by pressing the button 106 with the thumb. The user then places the gripping device 100 on the sheet material, releases the button 106, and moves the index finger away from the lock lever 160. In this mode the gripping member 118 is able to move further into the closed position but is prevented from moving into the open position. The user then holds down the sheet material with the free hand and pulls the gripping device 100. As the user pulls harder on the gripping device 100 the gripping force acting on the sheet material is increased. When the gripping force is sufficient for preventing the sheet material from slipping the user lifts the sheet material with the gripping device 100. To disengage the gripping device 100 the user releases the locking mechanism by pressing the lock lever 160 to the left and presses the button 106 down to open the gripping device 100. Provision of the lock mechanism enables gripping of light weight sheet material, a plurality of sheets at a time and/or sheet materials having a wet surface, i.e. it enables gripping in situations where the weight of the sheet material is insufficient to provide the gripping force needed to prevent slipping of the sheet material.

Figure 2A:
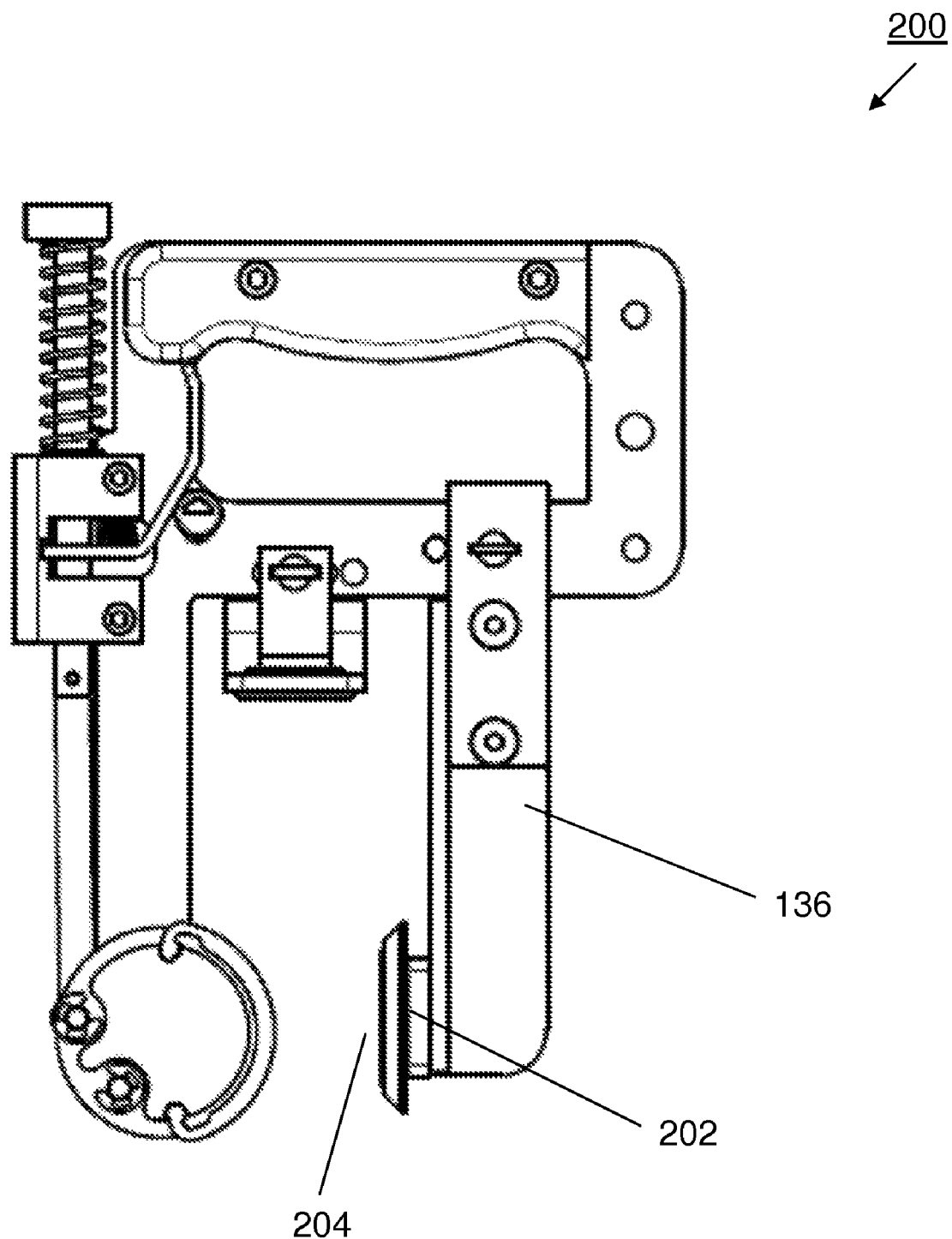
FIGS. 2a and 2b are simplified block diagrams illustrating a front view and a perspective view, respectively, of a gripping device according to another embodiment of the invention.
Figure 2B:
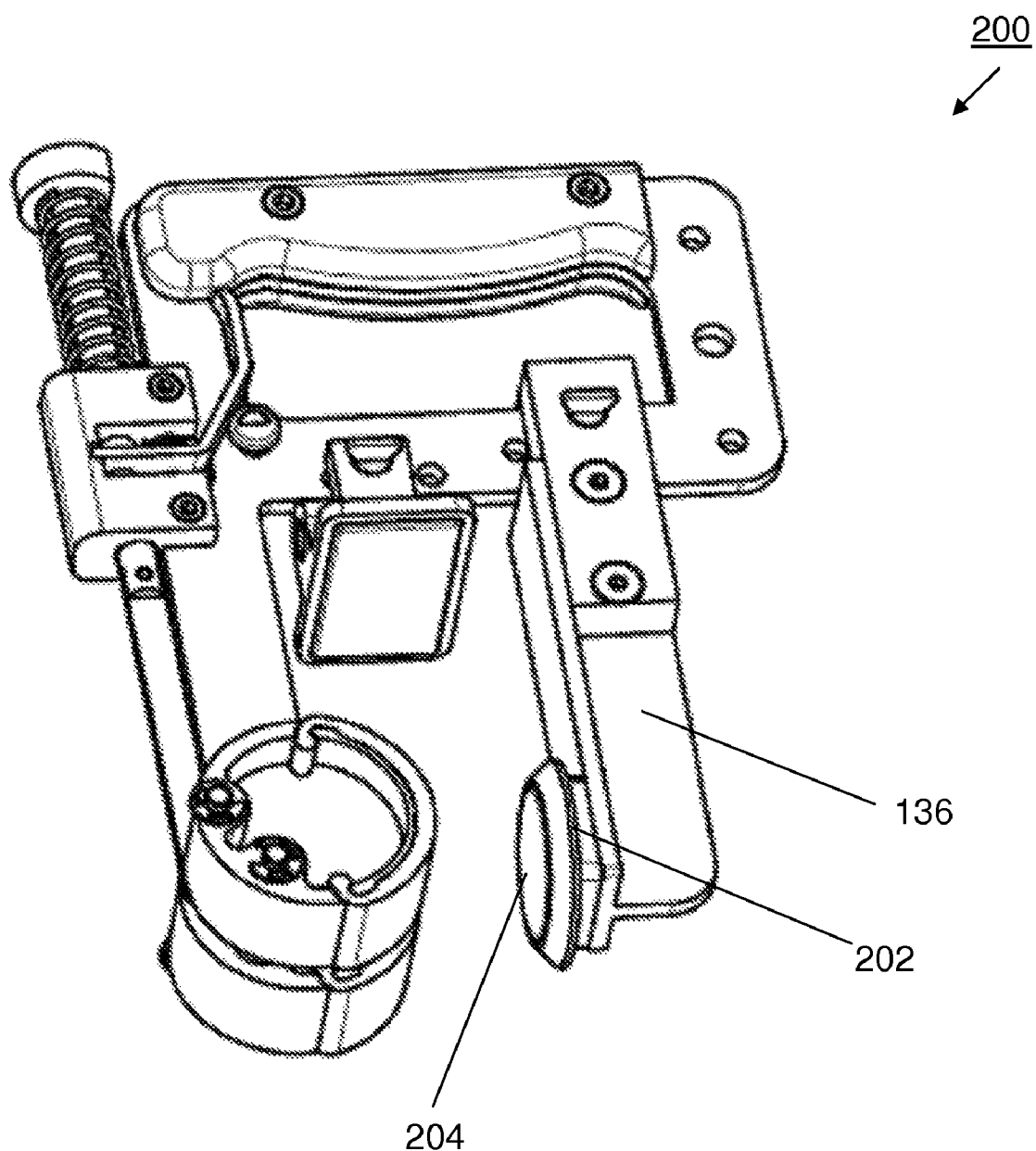

Referring to FIGS. 2a and 2b, another embodiment 200 of the gripping device according to the invention is provided. Here the gripping member 132 is replaced by gripping pad 202 having a flat gripping surface 204. The gripping pad 202 can be mounted to the extension member 136, or the frame structure 102, such that it is rotatable in a plane oriented parallel to the gripping surface 204. In use, the rotatable mounted pad 202 reduces the tendency of the gripping members to "walk" off the sheet material when there is angular movement between the sheet material and the handle of the gripping device 200, since the gripping surface 204 of the rotatable gripping pad stays substantially firm on the sheet material.

Figure 3A:
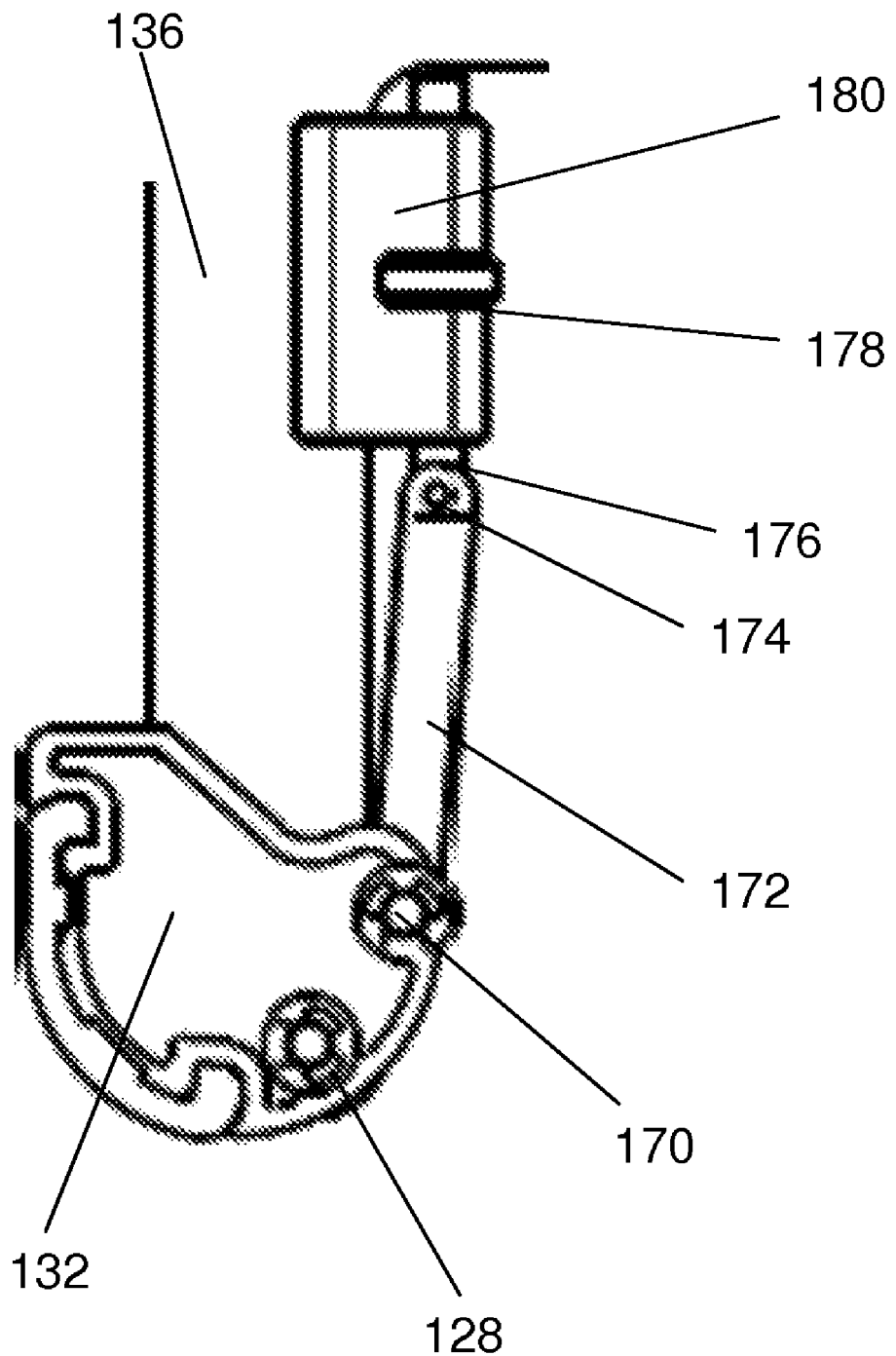
FIGS. 3a and 3b are simplified block diagrams illustrating a side view of embodiments of an adjusting mechanism of the gripping device according to an embodiment of the invention.

Referring to FIG. 3a, another embodiment for adjusting the gripping member 132 is shown. Here, the adjusting mechanism comprises adjusting actuator 172—connected via pivots 170 and 174 to the gripping member 132—and adjusting shaft 176, respectively. A threaded portion of the adjusting shaft 176 is disposed in adjusting housing 180 mounted to the extension member 136. Adjusting wheel 178, interacting with the threaded portion of the adjusting shaft 176, is partially accommodated in a respective slot of the adjusting housing 180. By rotating the adjusting wheel 178 adjusting shaft 176 is moved in a longitudinal direction. The longitudinal movement of the adjusting shaft 176 is then translated via the adjusting actuator 172 and the pivot 170 into rotational movement of the gripping member 132 around the pivot 128 for adjusting the position of the gripping member 132. With the adjusting wheel 178 being abutted in the slot of the adjusting housing 180 the gripping member 132 stays in a fixed position.

Figure 3B:
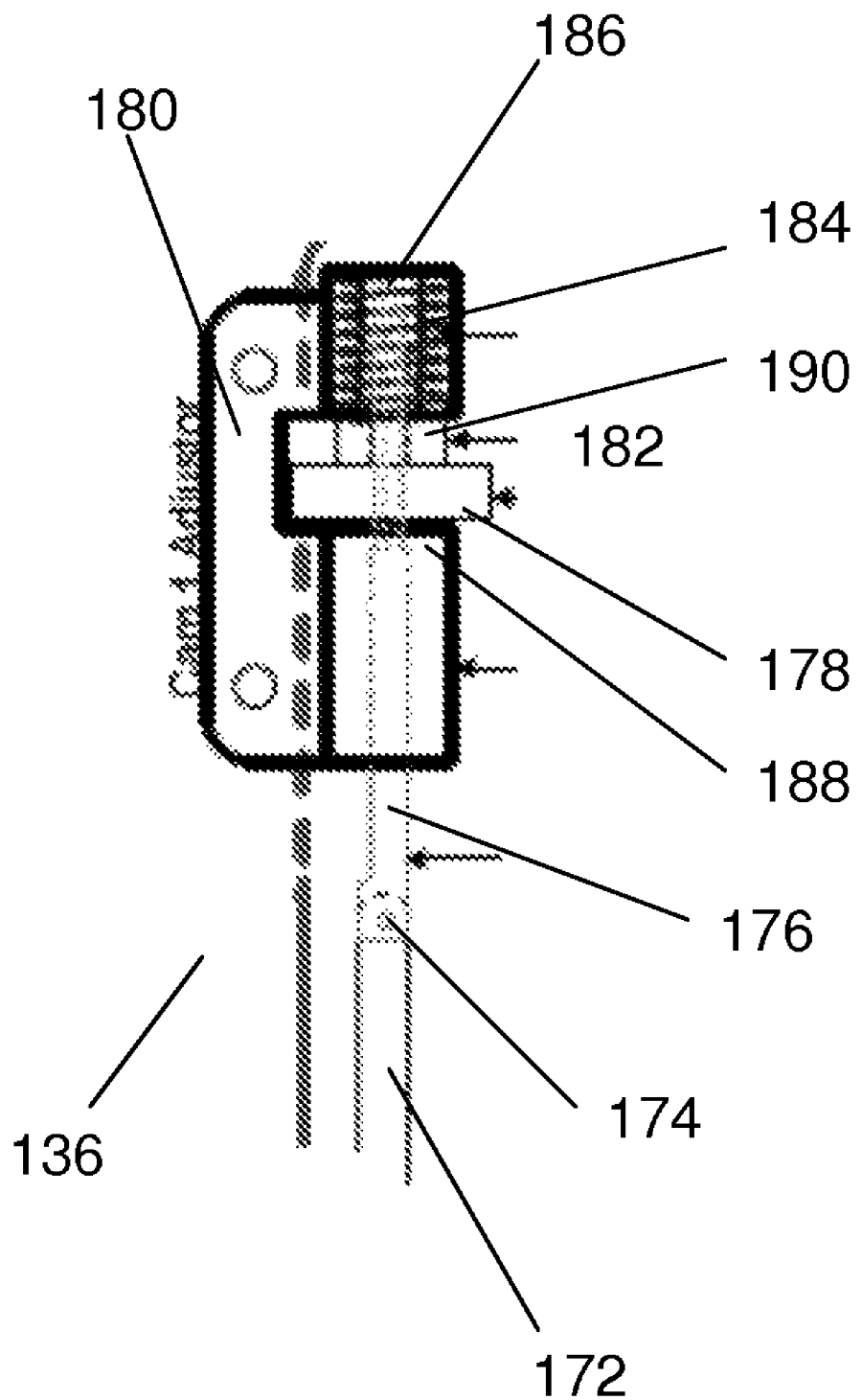

Referring to FIG. 3b, yet another embodiment for adjusting the gripping member 132 is shown. The adjusting mechanism is similar to the one shown in FIG. 3a, but comprises a wider slot in the adjusting housing 180, interacting member 182, and adjusting spring member 184. The interacting member 182 is disposed between the adjusting wheel 178 and the adjusting spring member 184 which is abutted at surface 186 of the adjusting housing 180. The spring member 184 pushes the adjusting wheel 178 via the interacting member 182 against surface 188 of the slot of the adjusting housing 180. The interacting member 182 enables turning of the adjusting wheel 178 while being pushed against the surface 188. Again, the gripping member 132 is adjusted by rotating the adjusting wheel 178 with the adjusting wheel 178 being pushed against the surface 188. Provision of the spring member 184 enables movement of the gripping member 132 in counter clockwise direction until the adjusting wheel 178 is abutted by opposite surface 190 of the slot.

Figure 4:
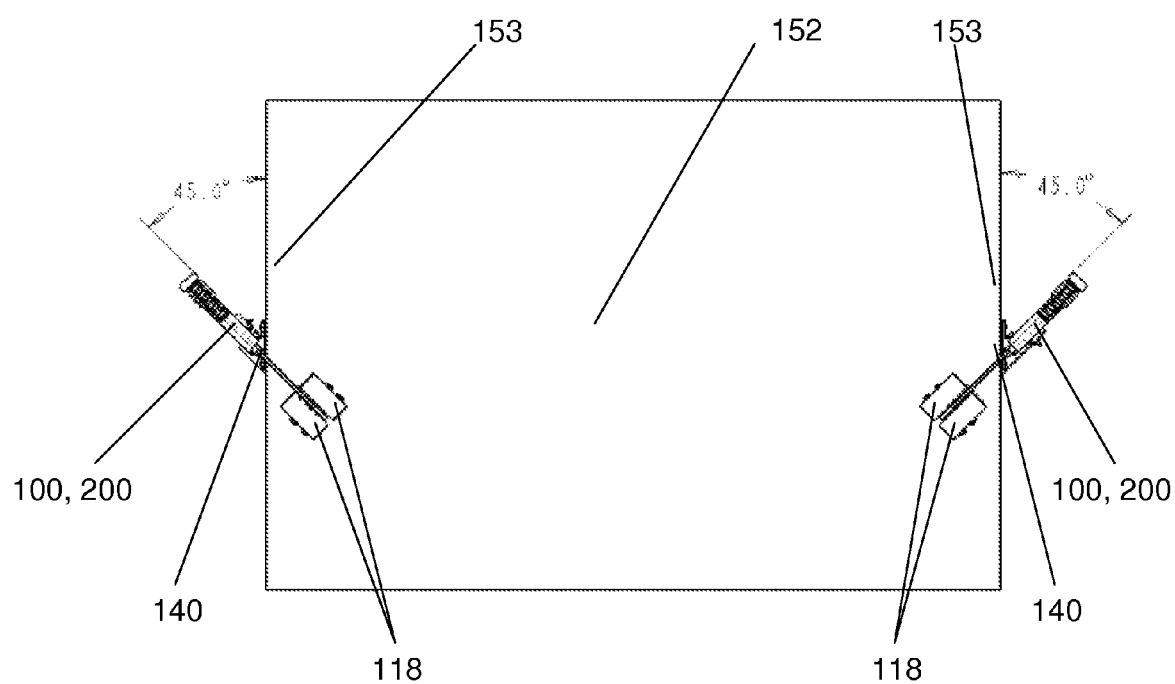
FIG. 4 is a simplified block diagram illustrating a front view of a sheet material with the gripping devices according to an embodiment of the invention engaged.

As illustrated in FIG. 4, the gripping devices 100 and 200 enable gripping of a sheet material 152 at an angle, for example, an angle of 45°, with the gripping members being engaged with the sheet material at a sufficient distance from the edge 153 and the rotatable abutting member 140 being in contact with the edge 153 to substantially prevent the gripping members from disengaging from the sheet material 152 due to angular movement of the handle of the gripping devices 100 and 200 with respect to the sheet material 152 which is, for example, frequently encountered when transporting sheet material using stairways.

The gripping members 118 and 132 can be made of metal such as, for example, steel to provide sufficient strength. Alternatively, the gripping members 118 and 132 are made of a suitable plastic material. In an alternative embodiment, the gripping members are made of a solid flexible rubber or solid flexible plastic material.

Further, the non-slip pads 124 and 126 of the gripping members 118 and 132 can be removable attached to the gripping members 118 and 132 for enabling simple replacement, as illustrated, for example, in FIGS. 1a to 1d. Alternatively, the non-slip pads 124 and 126 are omitted and the contact surfaces of the gripping members 118 and 132 comprise, for example, contact elements such as ridges or grooves.

Figure 5:
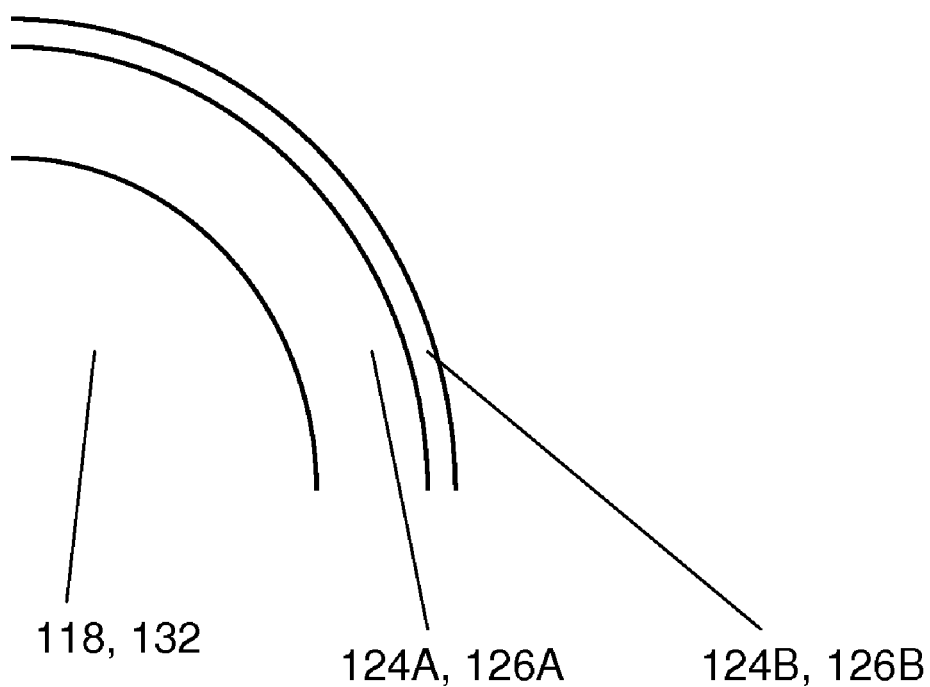
FIG. 5 is a simplified block diagram illustrating a cross sectional view of a non-slip-pad for use with the gripping devices according to the an embodiment of the invention.

Optionally, the non-slip-pads 124 and 126 comprise two layers, a flexible layer 124A, 126A and a non-slip interacting layer 124B, 126B for gripping the sheet material, as illustrated in FIG. 5. Both layers are made of, for example, suitable plastic or rubber material. The flexible layer 124A, 126A flattens as the gripping force increases, thus increasing the contact area between the non-slip interacting layer 124B, 126B and the corresponding surface of the sheet material.

Figure 6:
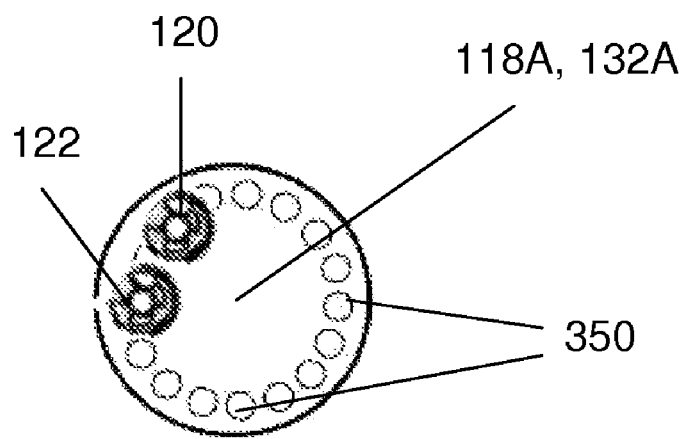
FIG. 6 is a simplified block diagram illustrating a front view of a gripping member for use with the gripping devices according to an embodiment of the invention; and, FIGS. 7a and 7b are simplified block diagrams illustrating a perspective view of the gripping devices according to an embodiment of the invention with one and two additional handles attached, respectively.

Referring to FIG. 6, the gripping members 118 and 132 comprise wheels 118A and 132A made of a solid but flexible material such as, for example, a rubber material, and have a plurality of bores 350 disposed at predetermined locations in proximity to the circumference. As the gripping force increases, the wheels 118A and 132A flatten, thus increasing the contact area between the wheels 118A and 132A and the corresponding surface of the sheet material. Furthermore, the bores 350 are disposed such that the pivots 120 and 122 are realized by accommodating bolts in the respective bores 350. As the contact area of the wheel wears the bolts are placed in respective bores 350 disposed at another location on the wheel providing a different section of the circumference for contacting the sheet material.

Figure 7A:
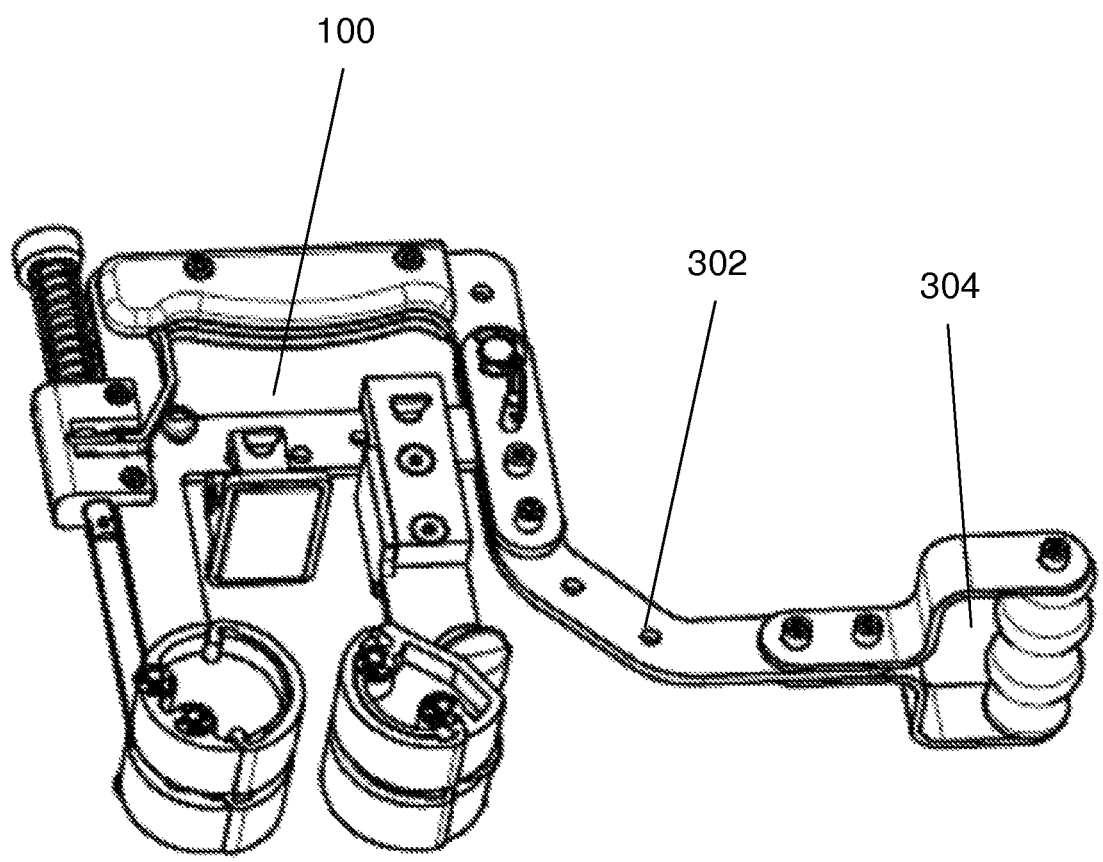
Figure 7B:
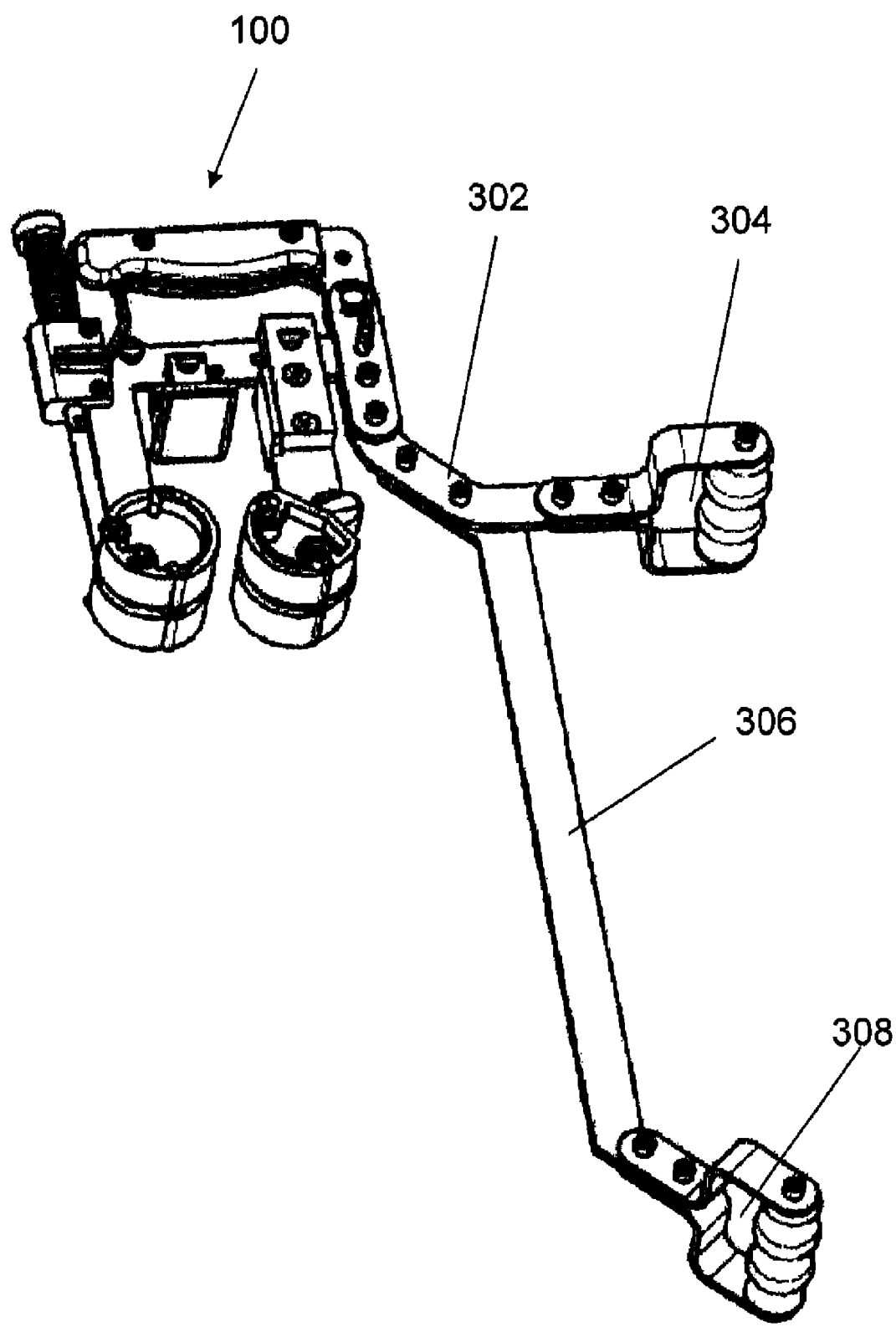

Referring to FIGS. 7a and 7b, additional handles are provided for holding the sheet material by one user with the gripping device 100 gripping the sheet material in proximity of the top edge. In one embodiment a first additional handle 304 is mounted to the frame structure 102 via first handle extension 302, as illustrated in FIG. 7a. Using the first additional handle 304, the user carries the sheet material using the hand/arm closest to the sheet material in an "up" position. Second additional handle 308 is mounted to the handle extension 302 via handle extension 306, as illustrated in FIG. 7b. Using the two additional handles 308 and 304, the hand/arm closest to the sheet material is in a "down" position holding the additional handle 308 close to the body. This hand/arm is carrying the weight of the sheet material in a straight position. The opposite hand is holding the additional handle 304 palm down with the arm crossed over the chest for stabilizing or balancing the sheet material. The additional handles 304 and 308 and the handle extensions 302 and 306 are easily mounted to the frame structure using, for example, threaded bolts and respective nuts mounted to bores disposed at predetermined locations.

The present invention has been described herein with regard to preferred embodiments. However, it will be obvious to persons skilled in the art that a number of variations and modifications can be made without departing from the scope of the invention as described herein.

What is claimed is:

1. A gripping device comprising:
   a frame structure;
   a first gripping member connected to the frame structure;
   a second gripping member rotatable mounted to the frame structure, the second gripping member being rotatable between an open position and a closed position for providing a gripping force acting on an object disposed between the first gripping member and the second gripping member;
   a spring member acting on the second gripping member for holding the second gripping member in the closed position; and
   a disengaging mechanism connected to the second gripping member for moving the second gripping member from the closed position to the open position in response to a pushing action provided by a user holding the gripping device, wherein the disengaging mechanism comprises:
      an actuator rotatable mounted to the second gripping member; and,
      a shaft rotatable mounted to the actuator and longitudinal movable mounted to the frame structure, the shaft being movable between a first position and a second position, the first position and the second position being associated with the open position and the closed position of the second gripping member, respectively.

2. A gripping device as defined in claim 1 comprising:
   a lock mechanism connected to the frame structure for preventing movement of the second gripping member from the closed position to the open position.

3. A gripping device as defined in claim 2 wherein the lock mechanism comprises a lock lever interacting with a predetermined portion of the shaft for preventing the movement of the second gripping member from the closed position to the open position.

4. A gripping device as defined in claim 1 wherein the first gripping member is variable connected to the frame structure for varying a distance between the first gripping member and the second gripping member in the closed position.

5. A gripping device as defined in claim 1 wherein an end portion of the shaft forms a button for enabling a user to open the gripping device by pushing the shaft from the second position to the first position.

6. A gripping device as defined in claim 1 wherein the frame structure comprises a handle for holding the gripping device and wherein the disengaging mechanism comprises a push button placed such that the user is enabled to push the push button with a thumb of a hand holding the handle.

7. A gripping device as defined in claim 6 wherein the disengaging mechanism comprises:
   an actuator rotatable mounted to the second gripping member; and,
   a shaft rotatable mounted to the actuator and longitudinal movable mounted to the frame structure, the shaft being movable between a first position and a second position, the first position and the second position being associated with the open position and the closed position of the second gripping member, respectively, an end portion of the shaft forming the push button for enabling the user to push the shaft from the second position to the first position.

8. A gripping device as defined in claim 6 comprising a lock mechanism connected to the frame structure for preventing movement of the second gripping member from the closed position to the open position, the lock mechanism having a lock lever placed such that the user is enabled to press the lock lever with an index finger of the hand holding the handle for disengaging the lock mechanism.

* * * * *